Nov. 28, 1967   H. J. ORR   3,355,630
METER STRUCTURE WITH IMBEDDED BUS BARS
AND JAW MOUNTING STRUCTURE
Filed Sept. 30, 1965   2 Sheets-Sheet 1

INVENTOR
HARLEY J. ORR
BY
ATTORNEYS

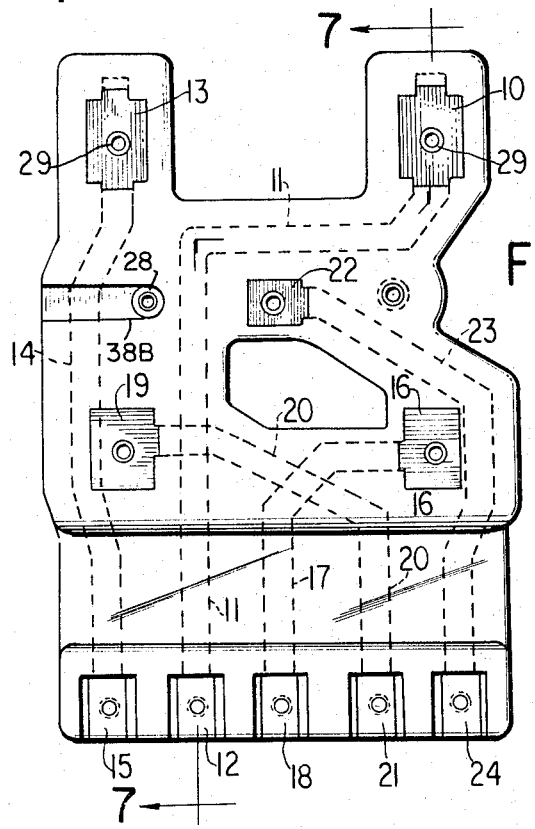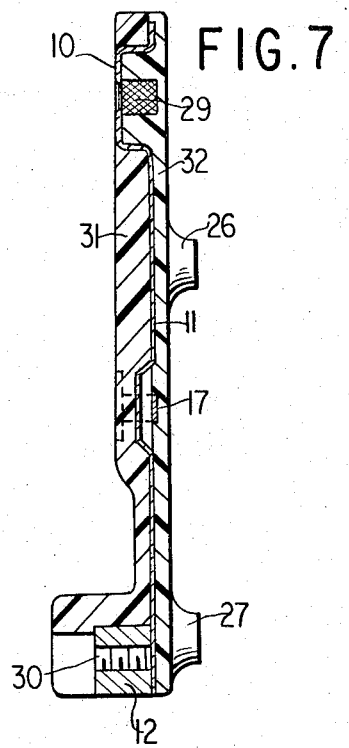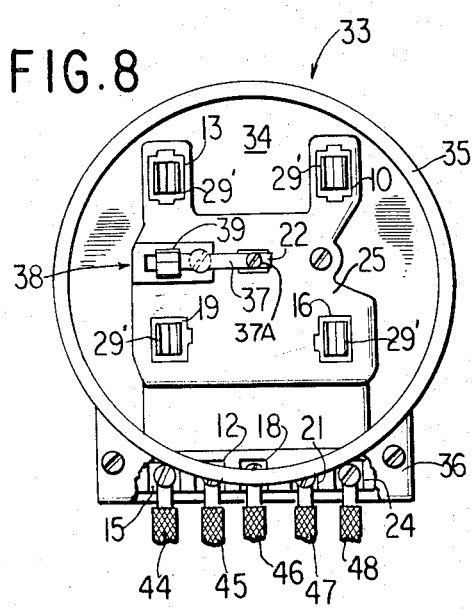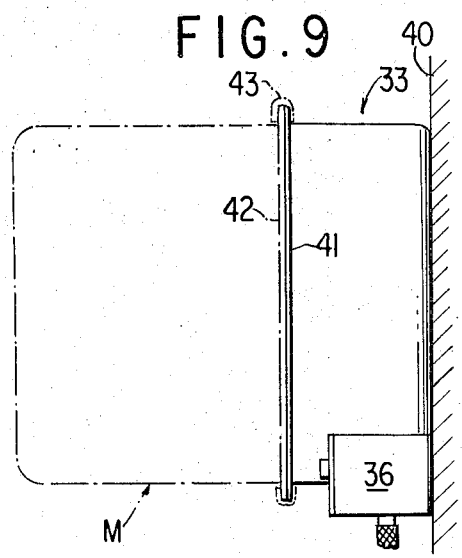
INVENTOR
HARLEY J. ORR
BY
ATTORNEYS

3,355,630
Patented Nov. 28, 1967

3,355,630
METER STRUCTURE WITH IMBEDDED BUS BARS AND JAW MOUNTING STRUCTURE
Harley J. Orr, Bedford, N.H., assignor to Basic Products Corporation, Milwaukee, Wis., a corporation of Wisconsin
Filed Sept. 30, 1965, Ser. No. 491,695
4 Claims. (Cl. 317—104)

ABSTRACT OF THE DISCLOSURE

A meter box in which bus bars having a raised jaw mounting platform on one end and a terminal connector at the other end are encapsulated in a block of insulating material with the platform exposed at an outer surface of the block and the connector terminals exposed at an end of the block.

---

This invention relates to meter boxes and particularly to an adapter for such boxes having bus bars encapsulated in a thermosetting plastic or the like.

Electrical meters usually include prongs extending rearwardly from the meter that are adapted to be connected to jaws of terminals mounted in a meter box. It often occurs that exposed wires within the box become shorted, thereby damaging the meter. Furthermore, when insulated wires are used, they have to be stripped and the ends formed properly to be connected to the prongs of the meter.

The principal object of the present invention is to provide a meter box and an interior assembly therein comprising encapsulated bus bars having jaws arranged to receive the prongs extending from the rear face of a meter when the latter is assembled to the meter box.

Another object of the invention is to provide such a meter box in which the only exposed wiring therein comprises the jaws adapted to receive the prongs extending from the rear of the meter.

Still another object of the invention is to provide such a meter box in which terminal connections to the interior assembly are located exteriorly of the meter box.

In one aspect of the invention, a meter box may comprise a plate having a flange extending peripherally about it and of such depth as to receive an interior assembly to be connected to the terminals of a meter.

In another aspect of the invention, the flanged portion of the box may have a slot therein through which may extend a portion of the interior assembly to which the electrical terminals are attached.

In still another aspect of the invention, the interior assembly of the meter box may comprise two pairs of jaw mounting platforms that are connected by bus bars to four of the terminal connections. A neutral mounting platform may also be connected by a bus bar to a fifth terminal connector comprising a ground connection.

In a further aspect of the invention, all of the jaw mounting platforms, the neutral mounting platform, and their corresponding bus bars may be encapsulated within a thermosetting plastic or the like. The encapsulating material also may be a thermoplastic or porcelain or similar insulating material.

In a still further aspect of the invention, two mating molded shells may be provided having passages therein adapted to receive the various jaw and neutral mounting platforms and their corresponding bus bars. When the mounting platforms and bus bars are located within the grooves of the two molded shells, they may be held together with tubular rivets or the like.

The above, other objects and novel features of the invention will become apparent from the following specification and accompanying drawings which are merely exemplary.

Figure 1:
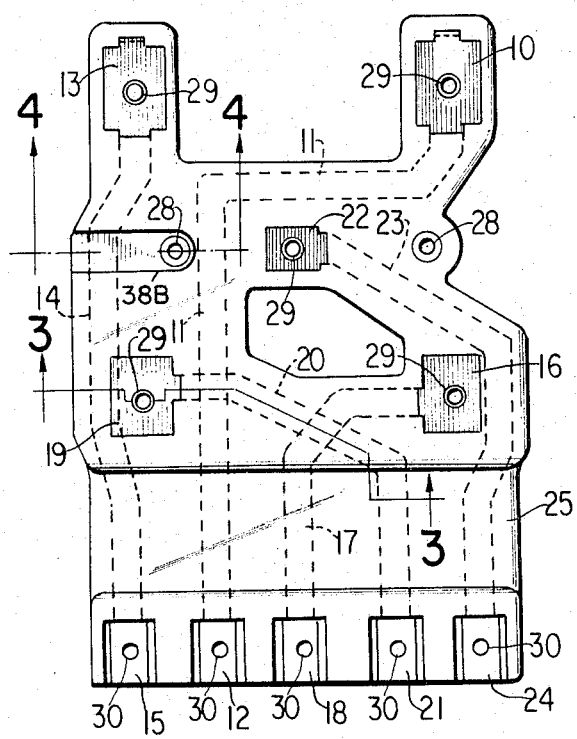
Figure 2:
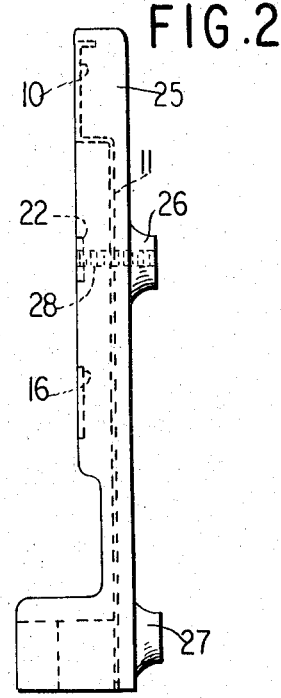
Figure 3:
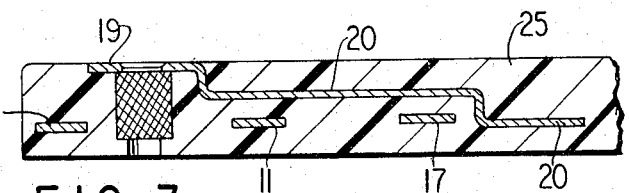
Figure 4:
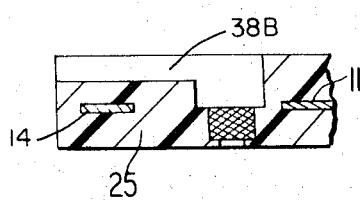
Figure 5:
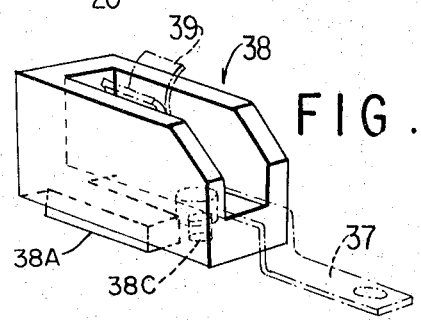

In the drawings:
FIG. 1 is a plan view of an encapsulated interior assembly for a meter box to which the principles of the invention have been applied;
FIG. 2 is an end elevational view of the assembly shown in FIG. 1;
FIG. 3 is a sectional elevational view taken substantially along line 3—3 of FIG. 1;
FIG. 4 is a sectional elevational view taken substantially along line 4—4 of FIG. 1;
FIG. 5 is a perspective view of a neutral mounting platform forming one detail of the present invention;
FIG. 6 is a view similar to FIG. 1, showing a modified form of the invention;
FIG. 7 is a view taken substantially along line 7—7 of FIG. 6;
FIG. 8 is a front view of a meter box having mounted therein an interior assembly to which the principles of the invention have been applied; and
FIG. 9 is an elevational view of a meter attached to a meter box to which the principles of the invention have been applied.

Referring to the drawings, and particularly to FIGS. 1 to 4, the principles of the invention have been shown as applied to the interior assembly of a meter box including a jaw mounting platform 10 connected by a bus bar 11 to a terminal 12. Another jaw mounting platform 13 transversely aligned with the platform 10 is connected by a bus bar 14 to a terminal 15. Still another jaw mounting platform 16, spaced longitudinally of the assembly and in longitudinal alignment with the platform 10, is connected by a bus bar 17 to a terminal 18. And, another jaw mounting platform 19 is connected by a bus bar 20 to a terminal 21.

A neutral mounting platform 22, located between the jaw mounting platforms, is connected by a bus bar 23 to a terminal 24.

The various bus bars are located at elevations such that those that cross each other's paths do so without contacting each other. With the above-identified parts in assembled relation as shown in FIG. 1, they are entirely encapsulated by a thermosetting plastic or the like, forming a block 25. A suitable plastic for encapsulating the assembly may be polycarbonate or other similar materials, one of which is known in the trade as "Lexan."

The block 25 may include bosses 26 and 27 on its rear face for spacing it from the back of the back face within a meter box. Threaded holes 28 may extend through the block 25 for mounting the encapsulated assembly within the meter box and forming a socket. Prong-receiving sockets 29 may be provided in the jaw mounting platforms for receiving prongs extending from the rear face of the meter that is adapted to be attached to the meter socket.

Each of the terminal connectors 12, 15, 18, 21 and 24 may also be provided with threaded holes 30 for receiving screws adapted to connect conductors to said terminal connectors. There also may be a socket 29 for the neutral mounting platform 22.

Referring to FIGS. 6 and 7, the principles of the invention are shown as applied to an assembly similar to that shown in FIG. 1 in which the bus bars and jaw mounting platforms including the neutral mounting platform are mounted between mating plates 31 and 32 of plastic material similar to that which is employed for the block 25. Mating members 31 and 32 include recesses for receiving the bus bars 11, 14, 17, 20 and 23, as well as terminal connectors 12, 15, 18, 21 and 24.

Referring to FIG. 8, a meter box 33 may comprise a back face 34 surrounded by a wall 35. A hollow boss forming an auxiliary housing 36 may be integrally attached to one side of the wall 35, and a slot may be provided in wall 35 adjacent the housing 36 so that the lower end of the block 25 containing the terminal connectors 12, 15, 18, 21, 24 may be located outside of the box 33. The block 25 (FIG. 8) is shown as having prong-type jaws 29' instead of the tubular type shown in FIGS. 1 and 6.

In the embodiment shown in FIG. 8, the neutral mounting platform 22 is shown connected to a bus bar 37 by a screw 37A. Referring to FIG. 5, the bus bar 37 extends into a channel-shaped member 38 that supports blades on auxiliary jaws 39 which are connected to the end of bar 37 opposite that connected to the platform 22. The member 38 is provided with a downwardly extending rectangular portion 38A shaped to fit into a recess 38B (FIGS. 1 and 6) provided in the outer surface of block 25. A screw 38C (FIG. 5) receivable in one of the holes 28 (FIGS. 1 and 6) provides for detachably mounting the member 38 on the block 25.

Referring to FIG. 9, the socket 33 is shown as mounted against a wall 40. It includes a flange 41 adapted to be contacted by a flange 42 of a meter M, and an annular connector 43 is employed to rigidly hold the meter M to the meter box 33 with the prongs extending from the back face of the meter M adjacent the flange 42 inwardly into the meter box 33 and engaging the platforms 29 and 39 within the block 25.

The terminal connectors 15 and 12 may be connected to conductors 44 and 45 supplying current to the platforms 10 and 13, and thence act to supply current to the meter M. After the current flows through the meter, it passes out the platforms 16 and 19, and thence out conductors 46 and 47 that are respectively connected to the terminal connectors 18 and 21. A ground prong on the meter may contact the platform 29, and a ground connection 48 may be connected to the terminal connector 24 which has been previously described as connected to the platform 22.

Although the various features of the improved encapsulated meter socket have been shown and described in detail to fully disclose two embodiments of the invention, it will be evident that changes may be made in such details and certain features may be used without others without departing from the principles of the invention.

What is claimed is:
1. In a meter box, a housing having a back plate surrounded by a wall; parallel spaced walls extending outwardly from the wall surrounding the back plate and forming an auxiliary housing, there being a communicating passage in the wall surrounding said back plate leading to said auxiliary housing; a plurality of electrically separated bus bars each having a raised portion at one end providing jaw mounting platforms and a neutral platform and each having a terminal connector at its other end, said bus bars being encapsulated in a block of insulating material with the upper surfaces of said platforms being exposed at an outer surface of said block and with said terminal connectors exposed at one end of said block; and means for connecting said block to said back plate, with said exposed terminal connectors extending through said passage and into said auxiliary housing.

2. A meter box combination as defined in claim 1 in which said block is provided with a non-circular recess on said outer surface, means including a jaw mounting member having a portion fitting in said recess provides for detachably mounting an auxiliary jaw on said block, and a bus means provides for connecting said auxiliary jaw to said neutral platform.

3. In a meter box, a housing having a back plate surrounded by a wall; parallel spaced walls extending outwardly from the wall surrounding the back plate and forming an auxiliary housing, there being a communicating passage in the wall surrounding said back plate leading to said auxiliary housing; a plurality of electrically separated bus bars each having a raised portion at one end providing a jaw mounting platform and each having a terminal connector at its other end, said bus bars being encapsulated in a solid block of insulating material with the upper surfaces of said platforms being exposed at an outer surface of said block and with said terminal connectors exposed at one end of said block; and means for connecting said block to said back plate, with said exposed terminal connectors extending through said passage and into said auxiliary housing.

4. In a meter box, a housing having a back plate surrounded by a wall; parallel spaced walls extending outwardly from the wall surrounding the back plate and forming an auxiliary housing, there being a communicating passage in the wall surrounding said back plate leading to said auxiliary housing; a plurality of electrically separated bus bars each having a raised portion at one end providing a jaw mounting platform and each having a terminal connector at its other end, said bus bars being encapsulated in a block of insulating material with the upper surfaces of said platforms being exposed at an outer surface of said block and with said terminal connectors exposed at one end of said block, said block being made up of mating portions having grooves and recesses therein for receiving said platforms and bus bars; and means for connecting said block to said back plate, with said exposed terminal connectors extending through said passage and into said auxiliary housing.

References Cited

UNITED STATES PATENTS

| | | |
|---|---|---|
| 2,691,693 | 10/1954 | Lewis. |
| 2,917,724 | 12/1959 | Jackson _____ 174—59 X |
| 3,061,763 | 10/1962 | Ekstrum _____ 317—109 X |
| 3,136,925 | 6/1964 | Klein _____ 317—107 |

ROBERT K. SCHAEFER, *Primary Examiner.*

J. R. SCOTT, *Assistant Examiner.*